United States Patent
Derouen

(10) Patent No.: US 12,385,515 B2
(45) Date of Patent: *Aug. 12, 2025

(54) METHOD AND APPARATUS FOR SECURING THREADED CONNECTIONS AGAINST UNWANTED ROTATION

(71) Applicant: Electric Line Technologies, LLC, Lafayette, LA (US)

(72) Inventor: Derrick P. Derouen, Breaux Bridge, LA (US)

(73) Assignee: ELECTRIC LINE TECHNOLOGIES, LLC, Lafayette, LA (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/398,768

(22) Filed: Dec. 28, 2023

(65) Prior Publication Data

US 2024/0133419 A1 Apr. 25, 2024

Related U.S. Application Data

(63) Continuation of application No. 18/349,608, filed on Jul. 10, 2023, now Pat. No. 11,859,651.

(60) Provisional application No. 63/389,396, filed on Jul. 15, 2022.

(51) Int. Cl.
*F16B 39/10* (2006.01)
*F16B 7/18* (2006.01)
*F16B 39/282* (2006.01)

(52) U.S. Cl.
CPC ............ *F16B 39/282* (2013.01); *F16B 7/182* (2013.01); *F16B 39/108* (2013.01)

(58) Field of Classification Search
CPC .......... F16B 39/08; F16B 39/10; F16B 39/24; F16B 39/282; F16B 7/182; F16B 7/187; F16B 39/108
USPC ....... 411/185, 190, 204, 209, 517, 520, 533, 411/122–124; 285/92
See application file for complete search history.

(56) References Cited

U.S. PATENT DOCUMENTS

| 613,630 | A | * | 11/1898 | Himes | F16B 39/108 411/313 |
| 836,507 | A | * | 11/1906 | Keene | F16B 39/108 411/976 |
| 1,166,049 | A | * | 12/1915 | Hyde | F16B 39/108 411/201 |
| 1,363,210 | A | * | 12/1920 | Loga | F16B 39/108 411/201 |

(Continued)

*Primary Examiner* — Flemming Saether
(74) *Attorney, Agent, or Firm* — Ted M. Anthony

(57) ABSTRACT

A lock ring to secure threaded components from inadvertent unscrewing, loosening or disassembling from each other. The lock ring can be constructed of relatively thin and pliable material. The lock ring has a central bore or hole and defines inner and outer ring surfaces. A plurality of locking tabs (including at least one bendable tab) extends outwardly from the outer ring surface, while at least one stand-off or spacer tab extends inwardly from the inner ring surface. Certain locking tabs can be bent or otherwise repositioned so that that they are received in aligned recesses in the threaded components. The lock ring can be installed between threaded components (such as, for example, wireline or electric line tools) and thereby prevents adjacent threaded components from unwanted or inadvertent rotation relative to each other.

9 Claims, 8 Drawing Sheets

(56) References Cited

U.S. PATENT DOCUMENTS

| | | | | |
|---|---|---|---|---|
| 1,685,120 | A * | 9/1928 | Carns | F16B 39/108 411/934 |
| 1,707,933 | A * | 4/1929 | Gibbons | F16B 39/108 411/123 |
| 3,483,789 | A * | 12/1969 | Wurzel | F16B 21/20 411/517 |
| 4,512,596 | A * | 4/1985 | Obrecht | F16D 1/02 285/330 |
| 4,812,094 | A * | 3/1989 | Grube | F16C 25/06 301/124.1 |
| 5,618,143 | A * | 4/1997 | Cronin, II | F16D 41/061 411/948 |
| 5,967,724 | A * | 10/1999 | Terry | F16B 39/24 411/533 |
| 6,275,556 | B1 * | 8/2001 | Kinney | G21C 7/14 403/279 |
| 6,290,442 | B1 * | 9/2001 | Peterkort | F16B 39/10 411/221 |
| 6,976,816 | B2 * | 12/2005 | Slesinski | F16C 25/06 411/122 |
| 10,184,598 | B2 * | 1/2019 | Williams | F16L 19/005 |
| 10,473,132 | B2 * | 11/2019 | Westgarth | F16B 7/18 |
| 11,359,747 | B2 * | 6/2022 | Belen | F16L 3/133 |
| 2014/0140787 | A1 * | 5/2014 | Gignoux | F16B 39/10 411/216 |
| 2015/0292544 | A1 * | 10/2015 | Rousseau | F01D 5/066 411/204 |
| 2021/0031905 | A1 * | 2/2021 | Lawson | F16B 39/28 |
| 2021/0108670 | A1 * | 4/2021 | Beaumel | F16B 37/044 |

\* cited by examiner

METHOD AND APPARATUS FOR SECURING THREADED CONNECTIONS AGAINST UNWANTED ROTATION

BACKGROUND OF THE INVENTION

1. Field of the Invention

The present invention pertains to a method and apparatus for securing a plurality of members joined by threaded connection(s) from inadvertently unscrewing, decoupling, loosening and/or disconnecting from each other. More particularly, the present invention pertains to a method and apparatus for securing components together without requiring use of set screws or other means that can severely damage said components or require substantial alterations to at least one of said components.

2. Description of Related Art

Many different devices used in many different applications comprise separate components that are joined together using threaded connections. Said threaded connections typically comprise a first connection member having "male" external threads, and a second "female" connection having internal threads. Application of torque force to one or both threaded connection members cause said male and female threads to be joined together in mating relationship.

By way of illustration, but not limitation, downhole electric line tools generally comprise multiple substantially cylindrical members that are commonly joined together in end-to-end relationship using threaded connections. Such tools can include, without limitation, casing collar locators and logging tools that are well known in the art. Typically, such tools are joined together using said threaded connections at a shop or other facility before being transported to a well site or other location where they can be conveyed within a subterranean wellbore. It is to be understood that such downhole electric line tools are just one illustrative example of devices or tools comprising multiple components joined together using mating male/female threaded connections.

In the case of such downhole electric line tools, it is critically important that the threaded connection between said members must not inadvertently loosen. Further, said components of said tools must not inadvertently unscrew or come apart from each other, particularly while being conveyed or operated within a wellbore. In many cases, such tools are exposed to contact or jarring with other objects that can apply torque or other forces to the components of said tools, thereby causing said components to inadvertently unscrew or detach from each other. Even if said components do not fully detach or separate from each other, partial unscrewing of said components can cause tool malfunctions, poor performance and/or other unwanted problems.

In order to prevent against such inadvertent loosening or unscrewing, set screws are frequently used to secure said components against unwanted rotation relative to each other. Generally, a set screw is screwed in a transverse threaded bore drilled in a first component to be secured, and partially received within an aligned detent or hole formed in the second (mating) component to ensure that the set screw cannot slide relative to the second component. Said set screw secures said components, by pressure and/or friction, against rotation relative to each other.

However, set screws and other conventional means of preventing such unwanted relative rotation of threaded components have significant drawbacks. Importantly, use of said set screws generally requires detailed machining of bores into, or other alteration of, said threaded components in order to accommodate said set screws, which can significantly increase the cost and complexity of the threaded components. Further, the set screws themselves can also inadvertently unscrew within a wellbore; when this occurs, the set screw can fall out of a threaded bore, and the loose set screw can create a "fish" downhole within a well that negatively impacts future operations in said well.

Thus, there is a need for an efficient and cost-effective means for securing threaded components against inadvertent loosening/unscrewing without drawbacks or limitations of conventional set screws or other existing solutions.

SUMMARY OF THE INVENTION

The present invention generally comprises a method and apparatus for locking a pair of members that are joined together in opposing end-to-end relationship using threaded connection(s); said locking system prevents said members from inadvertently unscrewing, decoupling, loosening and/or unintentionally disconnecting from each other. The locking system of the present invention can secure components together without requiring use of set screws or other conventional means that can severely damage said components or require substantial alterations to at least one of said components.

A lock ring can be selectively installed between first and second tool members that are joined together in opposing end-to-end relationship using threaded connection members. In a preferred embodiment, said lock ring comprises a substantially circular central ring member that is substantially planar or flat and defines a center hole. At least one spacer stand-off member is oriented radially inward from said central ring member and is disposed in said hole area. Said at least one spacer stand-off member ensures that said central ring member is positioned a desired distance away from the threads of one or both of said joined tool members.

A plurality of locking tabs extend radially outward from said central ring member; said locking tabs are generally disposed around the circumference of said central ring member in spaced relationship. In a preferred embodiment, said locking tabs are attached to central ring member in a substantially co-planar orientation, but can be selectively bent or intentionally deformed so that said locking tabs are oriented out of planar alignment with said central ring member. Put another way, said locking tabs can be selectively bent so that said locking tabs are disposed at an acute angle relative to central ring member.

At least one of said locking tabs of said lock ring can be selectively bent or otherwise displaced into at least one aligned notch of a first tool member and at least one aligned notch of a second tool member. In this manner, said lock ring effectively acts as a connector that structurally links said first and second tool members and prevents relative rotation of said first and second tool members around their central longitudinal axes. Said first tool member and said second tool member are prevented from rotating relative to each other by said lock ring and, as a result, from inadvertently unscrewing, decoupling, loosening and/or unintentionally disconnecting from each other.

The locking system of the present invention is relatively inexpensive and efficient to manufacture and use. It can be incorporated into new threaded components or tool members, or it can be used with existing equipment. The locking system can be utilized without specialized tools virtually

BRIEF DESCRIPTION OF DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

Further, the drawings constitute a part of this specification and include exemplary embodiments of the technology. It is to be understood that in some instances, various aspects of the invention may be shown exaggerated or enlarged to facilitate an understanding of the invention. Therefore, the drawings may not be to scale.

DETAILED DESCRIPTION OF A PREFERRED EMBODIMENT OF THE INVENTION

The present invention generally comprises a method and apparatus for locking a pair of opposing components that are joined together in end-to-end configuration using threaded connection(s); said locking system of the present invention prevents said members from inadvertently unscrewing, decoupling, loosening, disconnecting and/or unintentionally detaching from each other.

By way of illustration, but not limitation, downhole electric line tools generally comprise a plurality of substantially cylindrical members that are commonly joined together in end-to-end relationship using threaded connections. Although the present invention is described herein as being employed in connection with downhole electric line tools used in subterranean oil and gas wells, it is to be understood that such downhole electric line tools are just one illustrative example of devices or tools that can beneficially employ the locking system of the present invention. As such, although described herein in connection with said downhole electric line tools, it is to be observed that the locking system of the present invention can also be beneficially used in connection with other applications.

Figure 1:
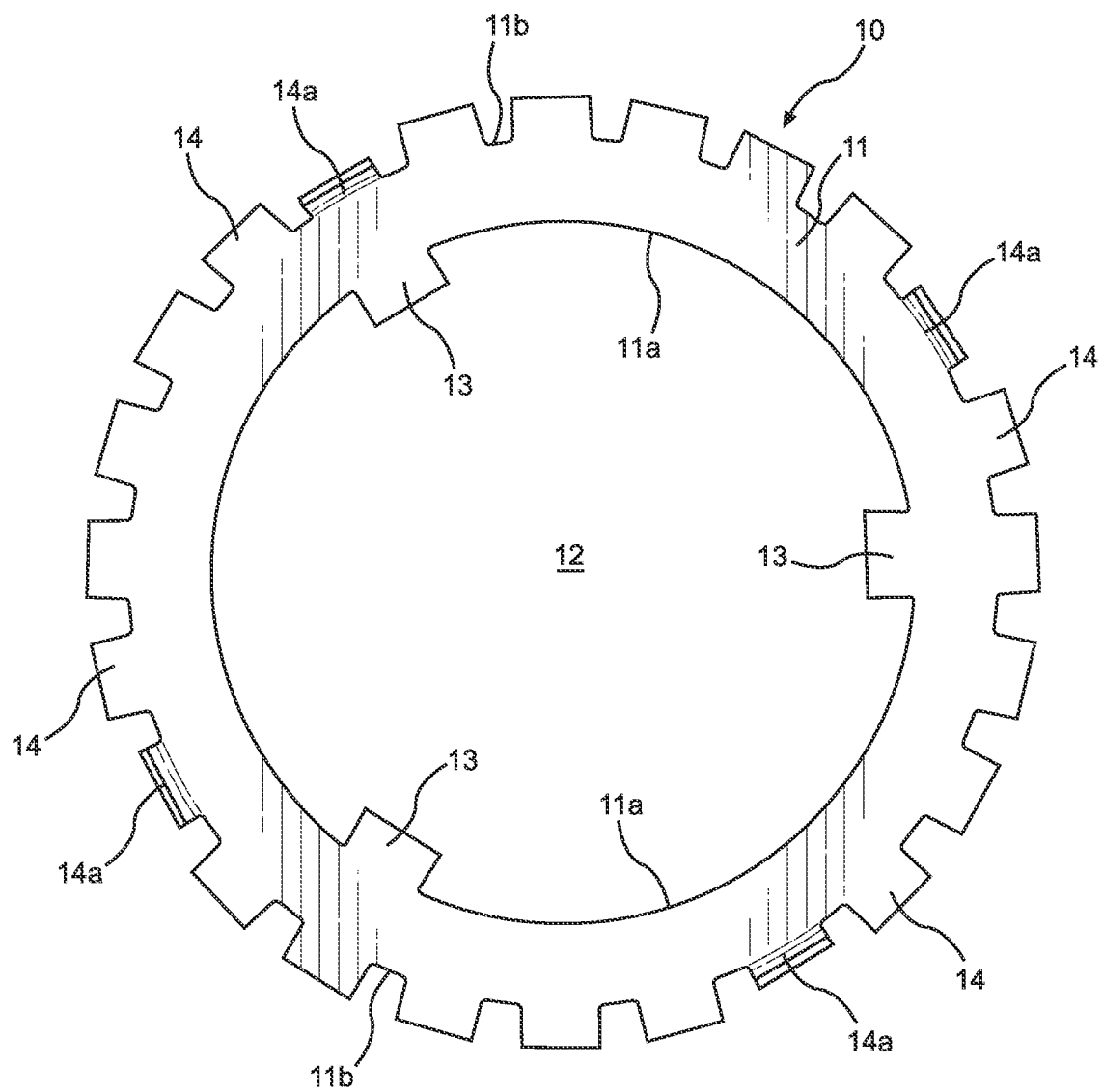
FIG. 1 depicts a front view of a lock ring of the present invention.

FIG. 1 depicts a front view of a lock ring 10 of the present invention. In a preferred embodiment, said lock ring 10 comprises a substantially circular central ring body member 11 forming a "doughnut" configuration and defining a center hole 12. At least one spacer stand-off member 13 is disposed within said central hole 12 and is oriented radially inward from the inner surface 11a of said central ring body member 11. In the embodiment depicted in FIG. 1, three (3) stand-off members 13 are disposed equidistantly around the circumference of said inner surface 11a at approximately 120-degrees separation between each of said stand-off members 13; however, it is to be observed that the number and spacing of said stand-off members 13 depicted in FIG. 1 are illustrative only, and said stand-off members 13 can number more or less than 3, and can be positioned relative to ring body member 11 differently than the depiction shown in FIG. 1. Said at least one spacer stand-off member 13 ensures that said central ring body member 11 is beneficially positioned at a desired distance relative to one or both of said joined tool members as more fully described herein.

Still referring to FIG. 1, a plurality of external locking tabs 14 extend radially outward from said central ring body member 11. Said plurality of external locking tabs 14 are generally disposed around the outer circumference of said central ring member in spaced relationship along outer surface 11b of said ring body member 11. The number and spacing of said external locking tabs 14 depicted in FIG. 1 are also illustrative only, and the actual number and spacing of said locking tabs 14 can be altered without departing from the scope of the present invention.

Figure 2:
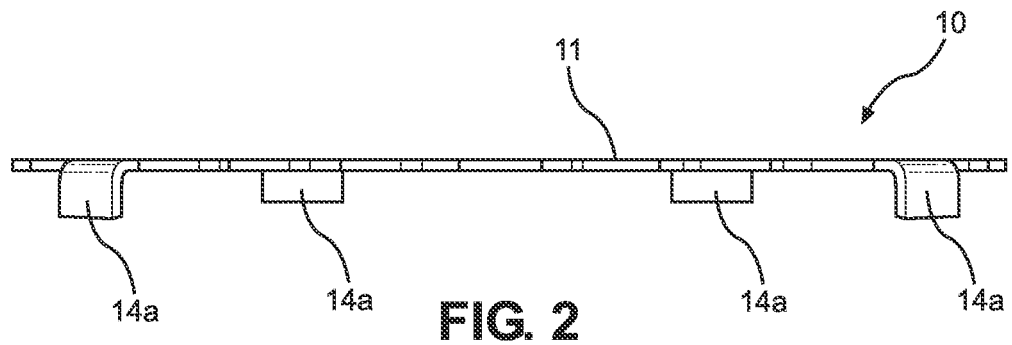
FIG. 2 depicts a side view of a lock ring of the present invention.

FIG. 2 depicts a side view of a lock ring 10 of the present invention. In a preferred embodiment, said lock ring 10 comprises central ring body member 11 having a substantially planar or flat shape when viewed from the side. As depicted in FIG. 2, a plurality of locking tabs 14 have been selectively bent or intentionally deformed so that said locking tabs 14a are at least partially oriented out of planar alignment with said central ring body member 11. Put another way, said locking tabs 14 can be selectively bent so that at least one of said locking tabs 14 can be re-positioned out of planar alignment with central ring body member 11. In the embodiment depicted in FIG. 2, said locking tabs 14a are intentionally bent to until they are oriented in approximately a 90-degree angle relative planar central body member 11.

Figure 3:
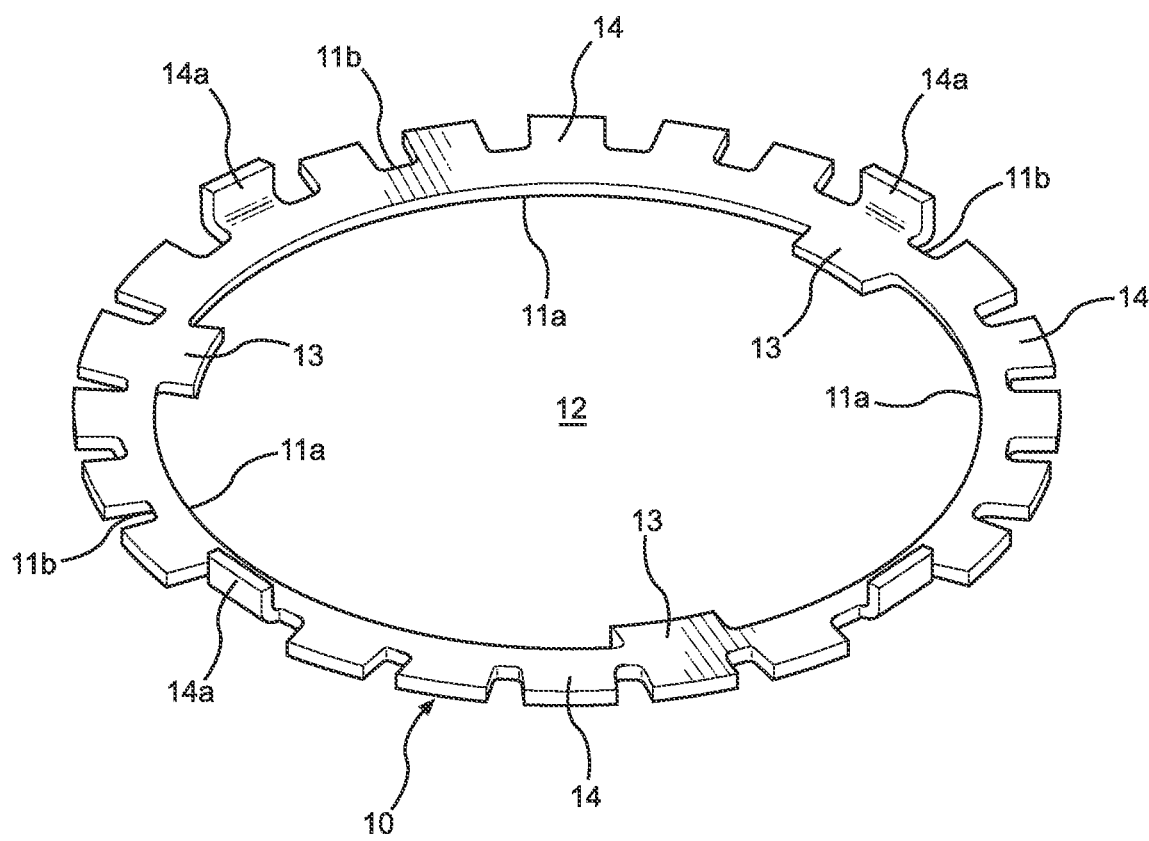
FIG. 3 depicts a side perspective view of a lock ring of the present invention.

FIG. 3 depicts a side perspective view of a lock ring 10 of the present invention. In a preferred embodiment, said lock ring 10 comprises central ring body member 11 having a substantially planar or flat shape, as well as a center hole 12 defining inner surface 11a. As depicted in FIG. 3, a plurality of spacer stand-off members 13 is disposed within said central hole 12 in spaced relationship around said inner surface 11a; said spacer stand-off members 13 are oriented radially inward from inner surface 11a of said central ring body member 11.

A plurality of external locking tabs 14 extend radially outward in spaced relationship from outer surface 11b of said central ring body member 11. Referring to FIGS. 2 and 3, it is to be understood that said external locking tabs 14 can be selectively bent or intentionally deformed so that they are, at least partially, out of planar alignment with said central ring body member 11. In a preferred embodiment, at least one of said locking tabs 14a can be repositioned at a right angle, or an acute angle, relative to central ring body member 11. Nonetheless, in the configuration depicted in FIGS. 2 and 3, the particular locking tabs 14a that are bent/deformed are illustrative only and are not in any particular pattern. Said locking tabs can be bent or deformed as desired by hand, or using common or readily available tools (such as pliers), but without requiring specialized tools.

Figure 4:
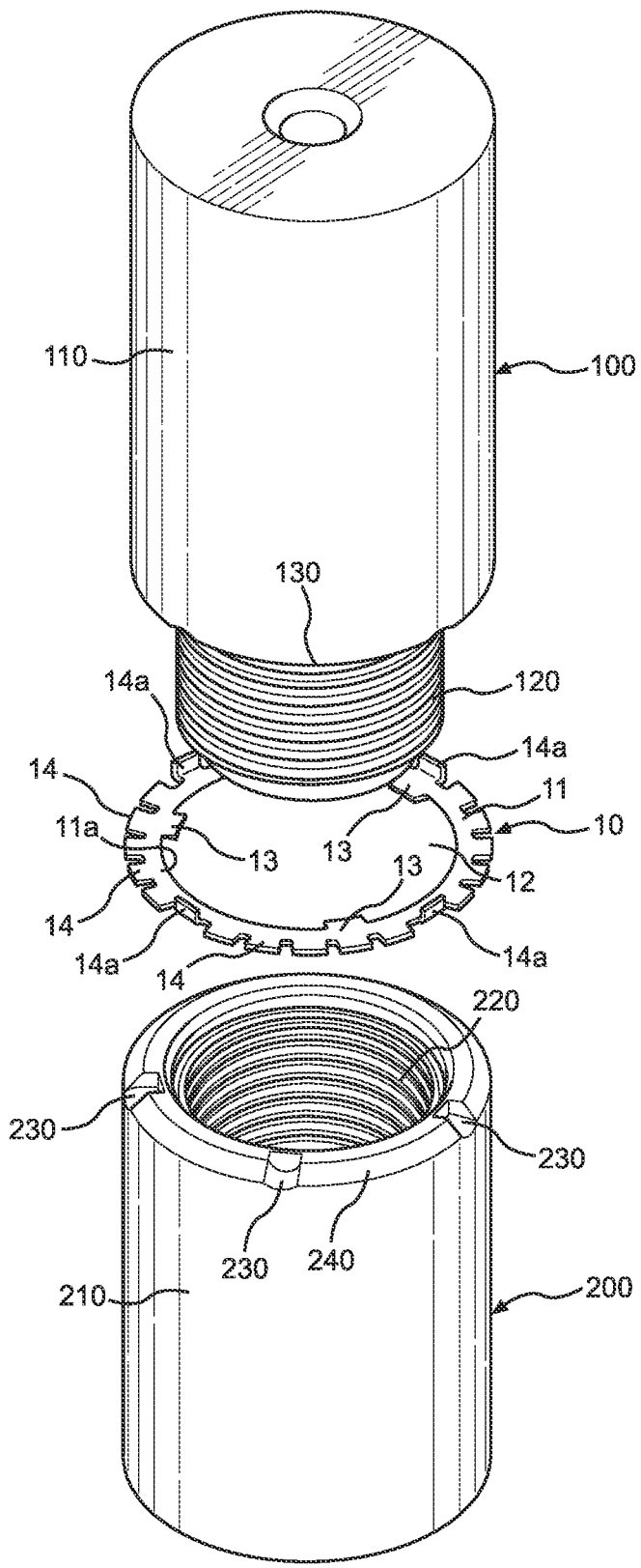
FIG. 4 depicts an overhead perspective and partially exploded view of a locking system of the present invention.
Figure 5:
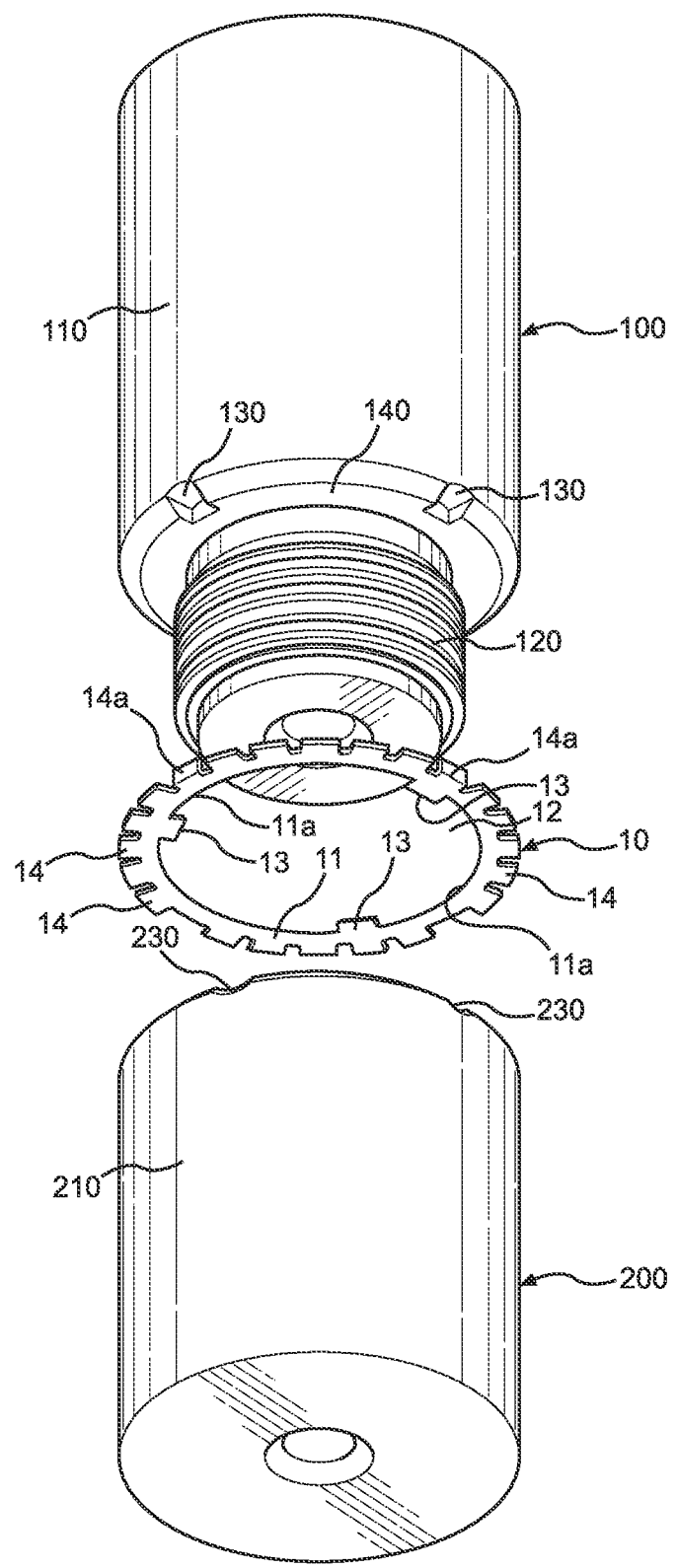
FIG. 5 depicts a bottom perspective and partially exploded view of a locking system of the present invention.

FIG. 4 depicts an overhead perspective and partially exploded view of a locking system of the present invention, while FIG. 5 depicts a bottom perspective and partially exploded view of said locking system. Substantially cylindrical first member 100 and substantially cylindrical second member 200 are disposed in end-to-end relationship, while lock ring 10 is positioned between said first member 100 and second member 200. For illustration purposes, said members 100 and 200 can represent components of a downhole electric line tool; however, it is to be understood that the present invention is not limited solely to use with electric line tools or similar applications.

First member 100 generally comprises body member 110 and male or "pin" threaded connection member 120 having external threads and defining shoulder surface 140 (best viewed in FIG. 5). Second member 200 generally comprises body member 210 defining shoulder surface 240, and female or "box" connection member 220 having internal threads. Referring to FIG. 4, a plurality of notches 230 are disposed in spaced relationship around said shoulder surface 240 of second member 200. Referring to FIG. 5, a plurality of notches 130 are disposed in spaced relationship around shoulder surface 140 of first member 100. The number and spacing of notches 230 and 130 depicted in the figures are illustrative only; the actual number and spacing of said notches 230 and 130 can be varied.

When joined, threaded connection member 120 of first member 100 is received within female threaded connection member 220 of second member 200. Application of torque forces causes external threads of threaded connection member 120 to engage with (that is, "screw into") internal threads of threaded connection member 220. In this configuration, lock ring 10 is disposed between said first member 100 and second member 200.

Still referring to FIGS. 4 and 5, lock ring 10 comprises central ring body member 11 having a substantially planar or flat shape, and defining a center hole 12. At least one spacer stand-off member 13 is disposed within said central hole 12 and is oriented radially inward from the inner surface 11a of said central ring body member 11. It is to be observed that threaded connection member 120 of first member 100 can be received within said central hole 12 of lock ring 10. Said at least one spacer stand-off member 13 disposed around inner surface 11b of said lock ring 10 ensures that said central ring body member 11 remains positioned a desired radial distance away from threaded connection member 120 of first member 100. A plurality of external locking tabs 14 extend radially outward from said central ring body member 11 of lock ring 10 and can be selectively bent or deformed so that at least one of said locking tabs 14a are at least partially disposed at an acute or right angle relative to central ring body member 11.

Figure 6:
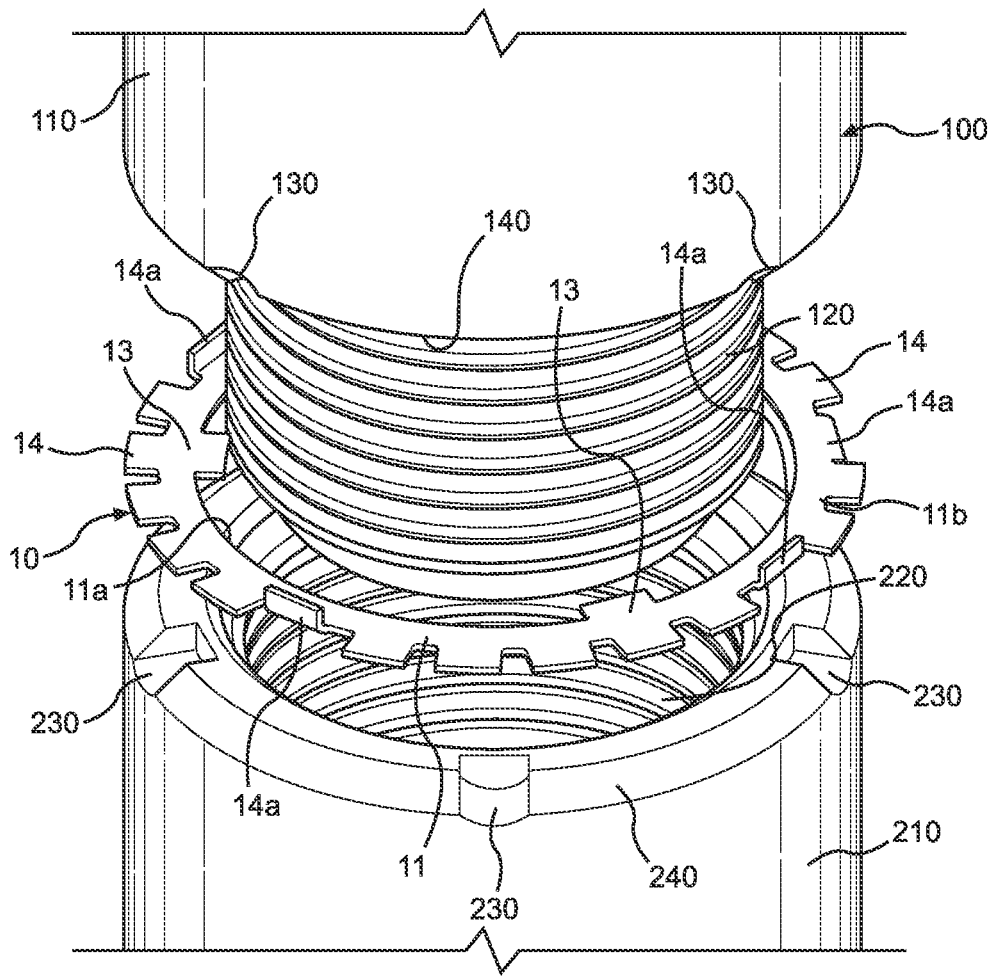
FIG. 6 depicts a detailed overhead perspective view of a locking system of the present invention.
Figure 7:
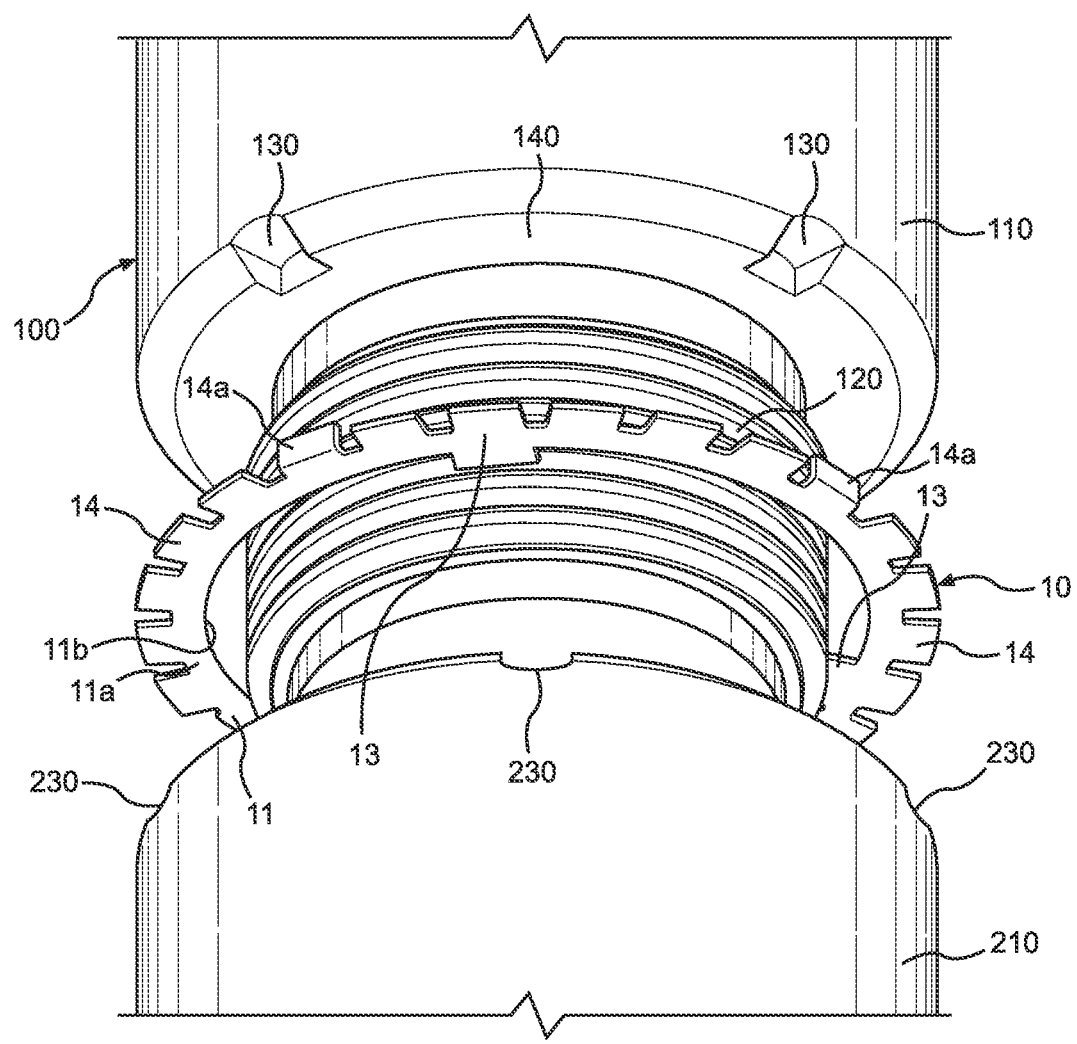
FIG. 7 depicts a detailed bottom perspective view of a locking system of the present invention.

FIG. 6 depicts a detailed overhead perspective view of a locking system of the present invention, while FIG. 7 depicts a detailed bottom perspective view of said locking system. First member 100 generally comprises body member 110 and male or "pin" threaded connection member 120 having external threads. Second member 200 generally comprises body member 210 and female or "box" connection member 220 having internal threads. In the configurations depicted in FIGS. 6 and 7, it is to be observed that male or "pin" external threads 120 of first member 100 are being inserted through hole 12 of lock ring 10 and into female or "box" connection member 220 of second member 200 having internal threads.

Referring to FIG. 6, body member 210 of second member 200 defines shoulder surface 240. A plurality of notches 230 are disposed in spaced relationship around said shoulder surface 240. Referring to FIG. 7, body member 110 of first member 100 defines shoulder surface 140. A plurality of notches 130 are disposed in spaced relationship around said shoulder surface 140. Said first member 100 and second member 200 can be joined and connected to each other in end-to-end relationship so that shoulder surfaces 140 and 240 oppose each other, and are in close proximity to each other.

Still referring to FIGS. 6 and 7, lock ring 10 is disposed between said first member 100 and second member 200. At least one spacer stand-off member 13 is disposed radially inward from said central ring member 11. Said at least one spacer stand-off member 13 ensures that said central ring member 11 is positioned a desired radial distance away from external threads 120 of first member 100 when said threads 120 are received within hole 12 of locking ring 10.

A plurality of locking tabs 14 extend radially outward from said central ring member 11; said locking tabs 14 are disposed around the circumference of said central ring member 11 in spaced relationship. In a preferred embodiment, said locking tabs 14 are attached to central ring member 11 in a substantially co-planar orientation, but can be selectively bent so that at least a portion of said locking tabs 14a are oriented out of planar alignment with said central ring member 11. Put another way, said locking tabs 14a can be selectively bent or partially repositioned, and can be bent or repositioned by hand and/or without the use of specialized tools.

Figure 8:
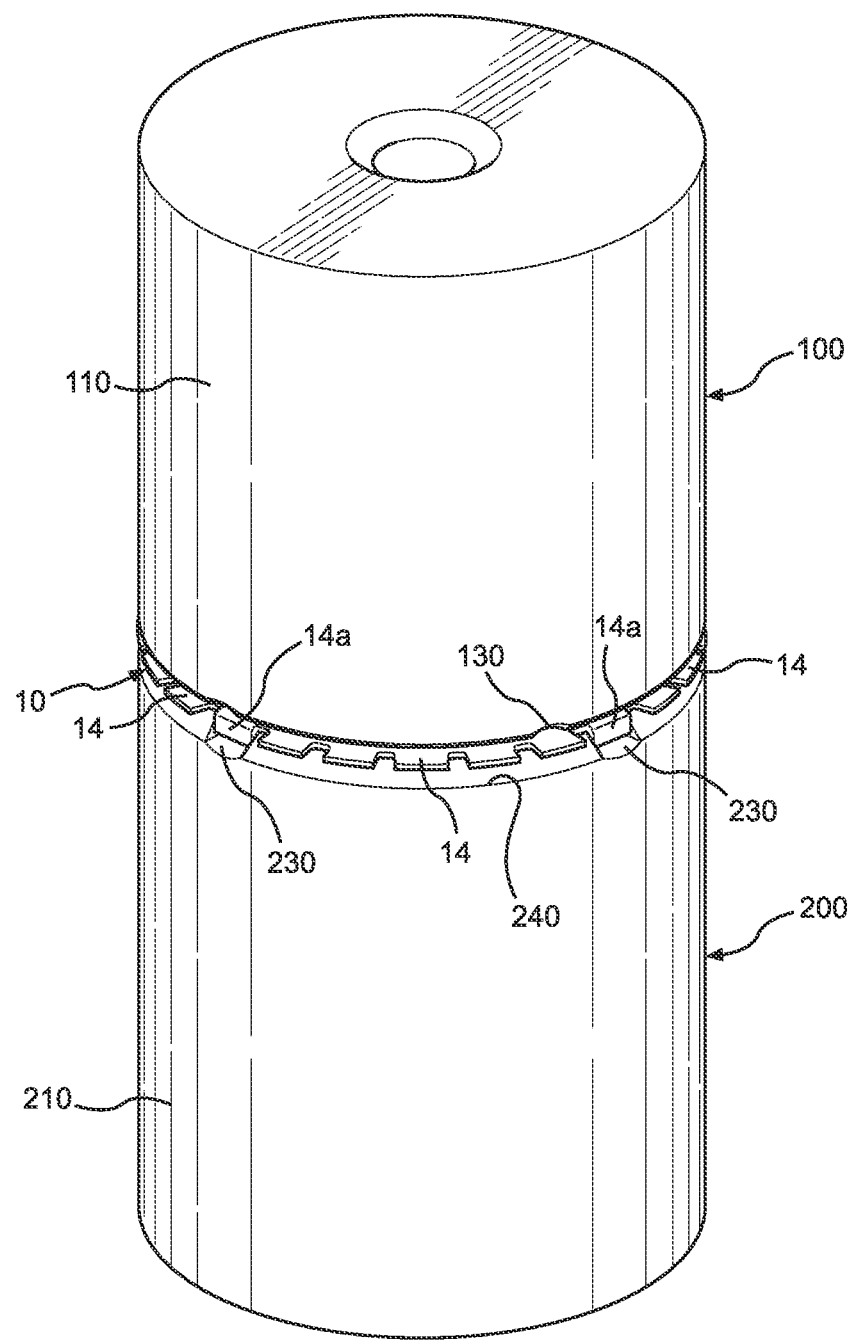
FIG. 8 depicts a perspective view of an assembled locking system of the present invention.
Figure 9:
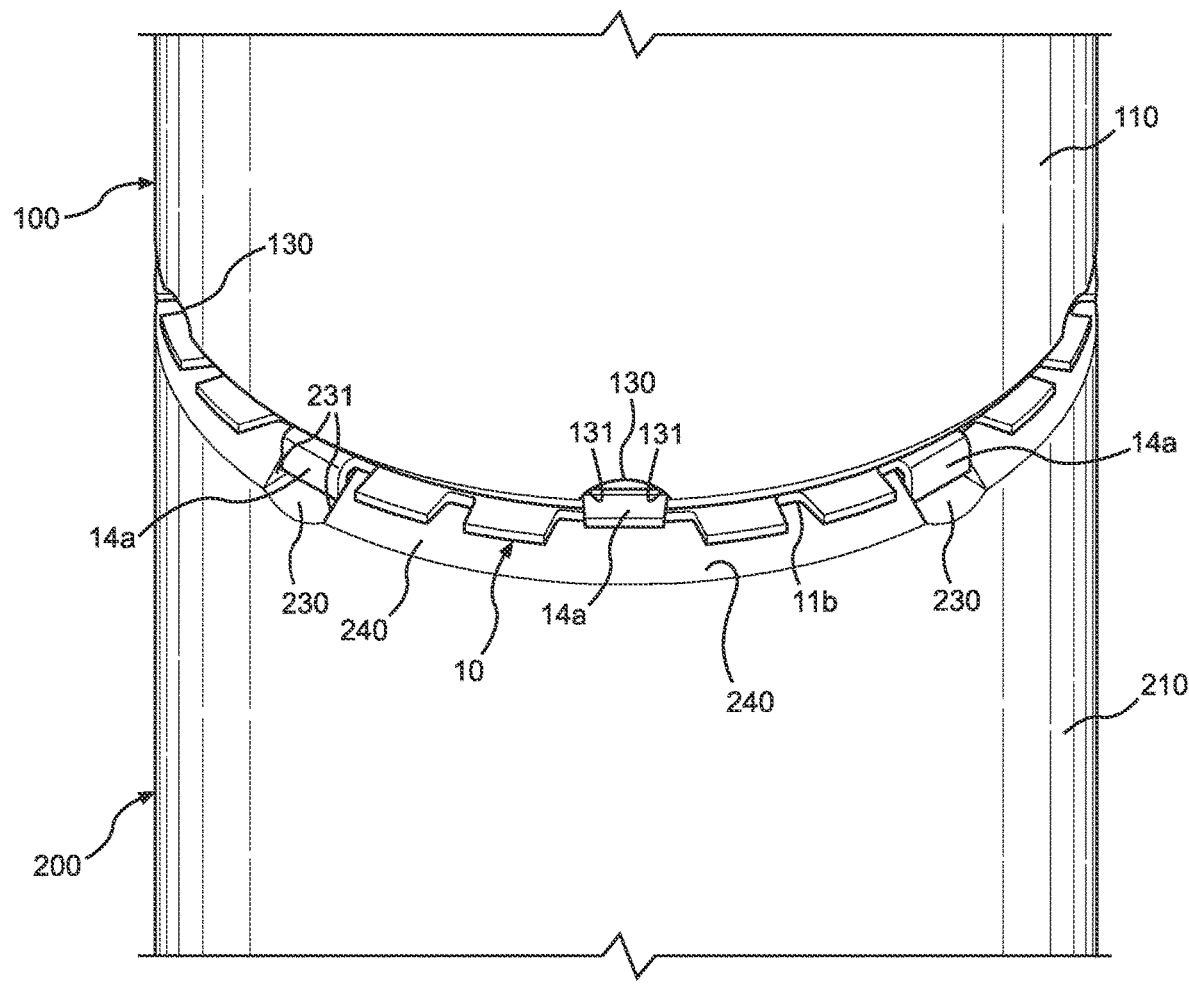
FIG. 9 depicts a detailed perspective view of the assembled locking system depicted in FIG. 8.

FIG. 8 depicts an overhead perspective view of an assembled locking system of the present invention, while FIG. 9 depicts a detailed perspective view of the assembled locking system depicted in FIG. 8. Referring to FIG. 8, body section 110 of first member 100, and body section 210 of second member 200, are joined to each other in end-to-end relationship so that shoulder surfaces 140 and 240 oppose each other. Lock ring 10 is disposed or "sandwiched" between said shoulder surface 140 of first member 100 and shoulder surface 240 of second member 200.

Referring to FIG. 9, a portion of at least one locking tab 14a of lock ring 10 can be selectively bent or otherwise displaced into at least one notch 230 of second member 200. In this configuration, said at least one locking tab 14a is received between side walls 231 formed by notch 230; said locking tab 14a cooperates with said side walls 231 to prevent side-to-side movement and rotation of lock ring 10 relative to shoulder 240 and second member 200 (such as around the longitudinal axis of said second member 200). Similarly, a portion of at least one locking tab 14a of lock ring 10 can be selectively bent or otherwise displaced into at least one notch 130 of first member 100. In this configuration, said at least one locking tab 14a is received between side walls 131 formed by notch 130; said locking tab 14a cooperates with said side walls 131 to prevent side-to-side movement and rotation of lock ring 10 relative to shoulder 140 and first member 100 (such as around the longitudinal axis of said first member 100).

In this configuration, lock ring 10 will not rotate relative to body section 110 of first member 100. Similarly, lock ring 10 will not rotate relative to body section 210 of second member 200. In this manner, lock ring 10 effectively acts as an intermediate linkage member disposed between first member 100 and second member 200 that interlocks said components and effectively prevents unwanted rotation of said first member 100 relative to said second member 200, and vice versa. As such, the lock ring of the present invention interlocks and prevents relative rotation between said first and second members.

It is to be observed that first member 100 and second member 200 can have the same number of notches (130 and 230, respectively). However, under this scenario, it is possible that notches 130 and 230 may become aligned with each other when first member 100 and second member 200 are threadedly connected. When this occurs, it can negatively affect connection of said first member 100 to said second member 200, and use of lock ring 10, particularly when said connection occurs at a wellsite or other remote location. Therefore, in a preferred embodiment, said first member 100 has a different number of notches 130 than the number of notches 230 in second member 200. When configured in this manner, at least one of said notches is effectively ensured to be out of direct alignment with an opposing notch.

Additionally, it is possible to "pre-bend" at least one locking tab 14a of lock ring 10 to fit into notches in one of said members (such as, for example, notches 130 of first member 100). By way of illustration, but not limitation, lock ring 10 can be installed on said first member 100 and said pre-bent locking tab(s) 14a can be received within notch(es) 130 of said first member 100; said pre-bent locking tab(s) 14a cooperate with notch(es) 130 to prevent rotation or spinning of lock ring 10 when second member 200 is threadedly connected to said first member 100. Thereafter, following threaded connection of first member 100 to second member 200, additional locking tab(s) 14a can be bent or deformed to be received within notch(es) 230 of second member 200. It is to be understood that locking tab(s) 14a can be bent or deformed into the desired configuration without the use of specialized tools; said tabs can be bent and/or deformed (including on a well site or other remote location) by hand or by using conventional pliers or other commonly available tools.

In the case of downhole electric line tools, said tools can be exposed to contact or jarring with the surrounding wellbore, casing, tubing and/or other objects, particularly while said tools are being conveyed in and/or out of the wellbore. Such contact can frequently result in the application of torque or other forces to the components of said tools, thereby causing said components to inadvertently unscrew, decouple, loosen and/or otherwise disconnect from each other. The locking system of the present invention can secure said components together without requiring use of set screws or other conventional locking means that can significantly damage said components and/or require substantial alterations to at least one of said components. Further, the locking system of the present invention is inexpensive and efficient to manufacture and deploy.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A lock ring configured to prevent relative rotation of first and second threaded cylindrical downhole wireline tools comprising:
   a) a ring member defining a central hole, said ring member received between a first threaded cylindrical downhole wireline tool and a second cylindrical downhole wireline tools, wherein said first threaded cylindrical downhole wireline tool and said second threaded cylindrical downhole wireline tool are joined together in end-to-end relationship, and wherein said ring member further comprises an inner surface and an outer surface; and
   b) a plurality of locking tabs disposed along said outer surface, wherein at least one of said locking tabs is configured to be at least partially received within an aligned notch on said first threaded cylindrical downhole wireline tool, and at least one of said locking tabs is configured to be at least partially received within an aligned notch on said second threaded downhole wireline tool.

2. The lock ring of claim 1, wherein at least one of said plurality of locking tabs is configured to be selectively repositioned out of planar alignment with said ring member and received within an aligned notch.

3. The lock ring of claim 2, wherein said at least one of said plurality of locking tabs is configured to be selectively repositioned without the use of specialized tools.

4. A method for preventing relative rotation of threaded downhole wireline tools comprising:
   a) installing a lock ring between a first threaded cylindrical downhole wireline tool and a second threaded cylindrical downhole wireline tool, wherein said lock ring comprises:
      i) a ring member defining a central hole, wherein said ring member further comprises an inner surface and an outer surface;
      ii) a plurality of locking tabs disposed along said outer surface; and
   b) threadedly connecting said first threaded cylindrical downhole wireline tool to said second threaded cylindrical downhole wireline tool in end-to-end relationship, wherein at least one of said locking tabs is received within an aligned notch on said first threaded cylindrical downhole wireline tool, and at least one of said locking tabs is received within an aligned notch on said second threaded cylindrical downhole wireline tool, and wherein said lock ring prevents relative rotation between said first threaded cylindrical downhole wireline tool and said second threaded cylindrical downhole wireline tools.

5. The method of claim 4, wherein at least one of said plurality of locking tabs is configured to be selectively repositioned out of planar alignment with said ring member.

6. The method of claim 5, wherein said at least one of said locking tabs is configured to be selectively repositioned without the use of specialized tools.

7. A method for preventing relative rotation of threaded downhole wireline tools comprising:
   a) providing a lock ring, wherein said lock ring comprises:
      i) a ring member defining a central hole, and wherein said ring member further comprises an inner surface and an outer surface;
      ii) a plurality of locking tabs disposed along said outer surface;
   b) installing said lock ring on a first threaded cylindrical downhole wireline tool having male threads, wherein said male threads are received in said central hole of said ring member;
   c) threadedly connecting said first threaded cylindrical downhole wireline tool to a second threaded cylindrical downhole wireline tool having female threads in end-to-end relationship;

d) selectively positioning at least one of said locking tabs at least partially within an aligned notch on said first threaded cylindrical downhole wireline tool; and e) selectively positioning at least one of said locking tabs at least partially within an aligned notch on said second threaded cylindrical downhole wireline tool, wherein said lock ring prevents relative rotation between said first threaded cylindrical downhole wireline tool and second threaded cylindrical downhole wireline tools.

8. The method of claim 7, wherein at least one of said plurality of locking tabs is configured to be selectively repositioned out of planar alignment with said ring member.

9. The method of claim 8, wherein said at least one of said locking tabs is configured to be selectively repositioned without the use of specialized tools.

* * * * *